Oct. 29, 1946.   J. H. MILLER   2,410,386
ELECTRICAL TESTING APPARATUS
Filed March 13, 1942
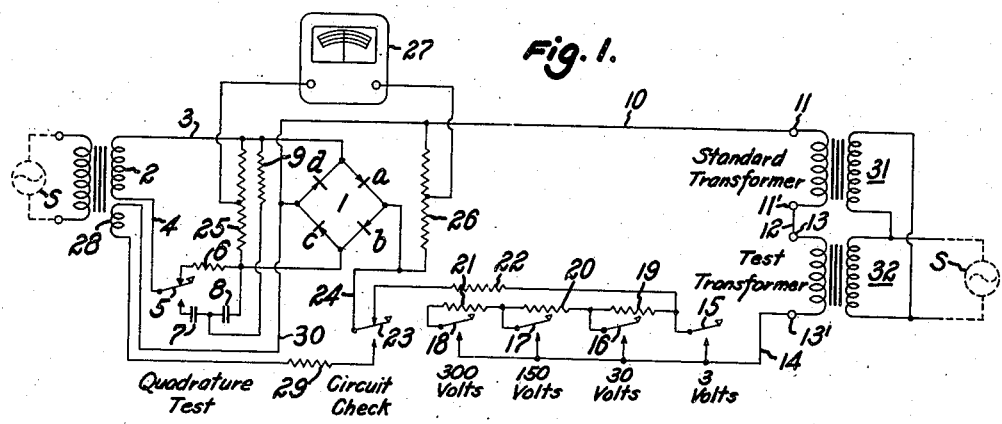
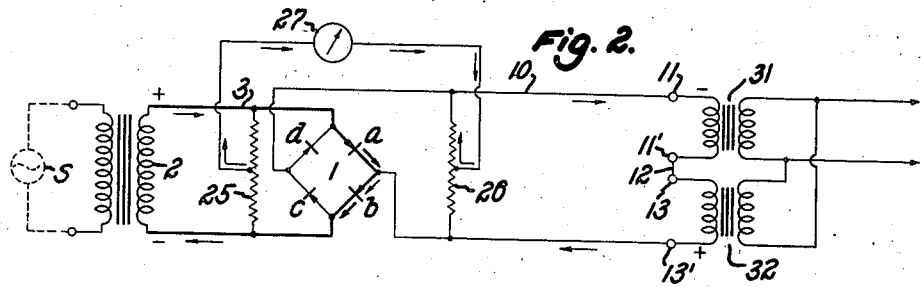
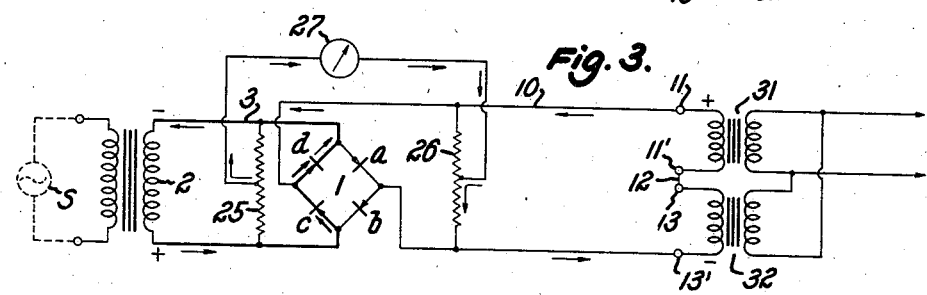
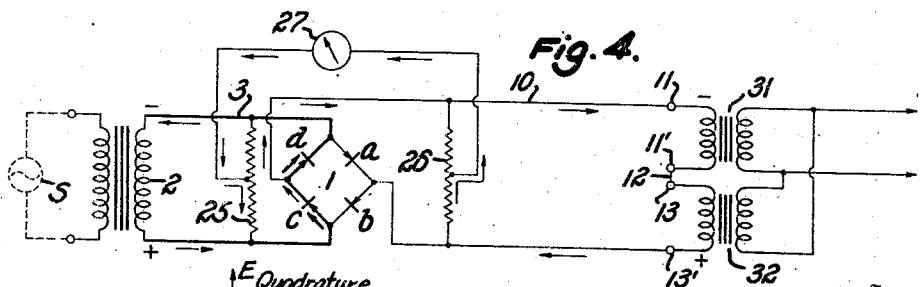
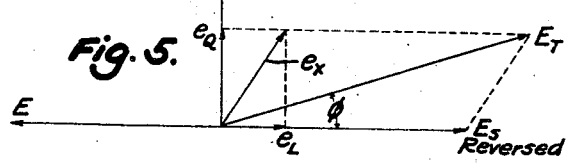

Patented Oct. 29, 1946

2,410,386

UNITED STATES PATENT OFFICE 2,410,386

ELECTRICAL TESTING APPARATUS

John H. Miller, Short Hills, N. J., assignor to Weston Electrical Instrument Corporation, Newark, N. J., a corporation of New Jersey Application March 13, 1942, Serial No. 434,577

5 Claims. (Cl. 175—183)

1

This invention relates to electrical testing apparatus for measuring the in-phase and quadrature components of a voltage with relationship to a reference source, and more particularly to an electrical instrument and circuit for testing potential transformers.

The invention contemplates the provision of an electrical indicating instrument, and a phase discriminatory network and its associated energizing and switch elements combined in a compact, portable case. The apparatus will be particularly described as a transformer tester, but it will be understood that this description is not intended as a limitation of the invention to any particular use.

Potential transformers are employed to actuate watt-hour meters which register the amount of electrical energy consumed by individual branches of a common supply line. Failures such as are likely to develop in the transformer usually result in a reduced voltage output, whereupon the watt-hour meter runs slow with a consequent loss in revenue to the public utility company furnishing the power.

Present equipment available for checking potential transformers is both elaborate and cumbersome, and requires a certain degree of laboratory refinement to obtain reliable data. One of the simpler forms of such equipment, known as a comparator voltmeter, comprises an electrodynamometer instrument having a separately excited field coil. The movable coil is actuated by the differential voltage existing between the secondaries of the transformer under test and a standard transformer of known characteristics when the secondaries are connected in series opposition. The deflection of the instrument pointer represents the magnitude of the differential voltage between the two transformer secondaries or rather, that component of the differential voltage which is in phase with the magnetic flux emanating from the field coils of the instrument. A similar reading is obtained under conditions wherein the exciting voltage is displaced 90 or 120 degrees from that to which the standard and test transformers are connected. There is thus obtained the magnitudes of two voltage components that are displaced in space, and these may be added vectorially to obtain the actual value and phase position of the differential voltage. This resultant voltage may then be added vectorially to the known secondary voltage of the standard transformer to obtain exact data as to the output voltage of the transformer under test.

2

This electrodynamometer type of testing apparatus is open to several objections. Inasmuch as the field coils of the electrodynamometer require a fairly large current, the condenser network which is required to bring the magnetic flux into phase with the exciting voltage is unduly large. The prior apparatus is therefore bulky, expensive and not readily portable. Also the requirement of two voltage sources displaced by 90 or 120 degrees restricts the use of the device to polyphase systems or, alternatively, requires the provision of such voltage sources in some other manner.

An object of this invention is the provision of a compact portable apparatus for determining the in-phase and the quadrature components of a voltage source with respect to a reference source.

An object is the provision of a novel electrical testing apparatus by which the voltage output of a transformer may be quickly and easily determined in the field.

Another object of this invention is the provision of a compact, portable transformer tester for determining the voltage output of a transformer without the need of a polyphase voltage source.

A further object is the provision of a transformer tester comprising a direct current indicating instrument, a phase discriminatory network, and associated circuit elements for obtaining, by direct readings upon the closure of energizing switches, two voltage values from which the exact voltage and phase displacement of the particular transformer may be determined.

A still further object is the provision of a transformer tester comprising a direct current indicating instrument, a rectifier modulator bridge, a source of exciting or switching voltage for the modulation bridge, circuit elements for obtaining a quadrature voltage for exciting the bridge, a source of voltage for checking the circuit conditions by reference to the indication of the instrument, and selective switching devices by which a test transformer of unknown output voltage may safely be connected into the circuit for checking purposes.

These and other objects and advantages will be apparent from the following description when taken with the accompanying drawing. The drawing is intended for purposes of illustration, and is not to be construed as defining the limits of the invention, reference being had, for this purpose, to the appended claims.

In the drawing, wherein like characters identify like parts in the several figures:

Figure 1 is a complete circuit diagram of an electrical testing apparatus embodying the invention;

Figures 2 to 4, inclusive, are simplified, schematic diagrams illustrating the directions of the currents in the various circuits under different conditions; and Figure 5 is a vector diagram of the measured voltages indicated by the measuring instrument.

A testing apparatus made in accordance with this invention may be housed in a small portable casing and provides a quick and accurate means for checking potential transformers by a semi-skilled operator. The circuit comprises a rectifier modulator bridge 1 consisting of four rectifier elements a—d arranged in the same sense in a closed ring. The modulator bridge is excited by the secondary winding 2 of a transformer which is connected to an alternating current source S by any suitable leads. One side of the secondary winding 2 is connected to one junction of the modulator bridge by the wire 3 and the other end of the winding is connected to the opposite bridge junction by the wire 4, the normally closed side of the manually operable switch 5, and the resistor 6. The other contact of switch 5 is connected to the bridge junction through the condensers 7, 8 in series, and the common terminal of the condensers is connected to the wire 3 and its associated bridge junction through the resistor 9. The depressing of switch 5 substitutes a capacitive reactance for the ohmic resistance that is normally connected between the secondary winding 2 and the modulator bridge, thereby shifting the bridge exciting voltage by 90°. The serially connected condensers 7, 8 and the shunt resistor 9 result in a current flow to the bridge that is exactly in quadrature with the line voltage. The legend "Quadrature test" preferably appears on the panel adjacent the pushbutton of the switch 5 to identify its function.

The conjugate diagonal arm of the modulator bridge 1 is to include the secondary windings of a "standard" transformer and of the transformer under test, and a resistance-switch network for adjusting the voltage measuring range of the indicating instrument. The elements of this circuit that are built into the portable testing apparatus include the lead 10 from a bridge junction to terminal 11 of the pair across which one transformer is to be connected, a jumper 12 from the other terminal 11' of that pair of terminal 13 of the pair of terminals 13, 13' across which the other transformer secondary is to be connected, and the resistor-switch network. A lead 14 connects terminal 13' to the fixed contacts of normally open pushbutton switches 15—18 that have contact blades serially connected through voltage-multiplier resistors 19, 20 and 21. The blade of switch 15 is also connected through the "low range" resistor 22 to the back contact of a pushbutton switch 23 having a blade connected by lead 24 to the bridge junction point. Center tapped resistors 25, 26 are shunted across the described conjugate bridge arms, and a multiple scale, direct current voltmeter 27 is connected across the midtaps of the resistors 25, 26. These shunt resistors facilitate the connection of the measuring circuit to those points of the modulator bridge network across which each alternating current input circuit establishes a direct current potential but not an alternating current potential. This electrical isolation of the direct current measuring circuit from the alternating current input circuits may be effected by connecting the measuring circuit directly between the electrical midpoint of the energizing winding 2 and a tap on a resistor that replaces the jumper 12, i. e. the electrical midpoint of the serially connected secondaries of the power transformers.

Legends such as "300 volts" are placed adjacent the several pushbutton switches 15—18 to indicate the measuring range established by each switch.

A separate winding 28 on the energizing transformer provides a check potential for testing the condition of the apparatus before a test is made. A resistor 29 is connected between the winding 28 and the front contact of the switch 23, and a lead 30 from the other side of the winding 28 to the bridge junction opposite that to which switch 23 is connected. This check circuit is normally open at the switch 23, and a legend such as "Circuit check" is preferably placed on the panel adjacent the switch 23.

As indicated above, the secondary windings of the standard transformer 31 and of the transformer 32 under test are connected across the terminals 11, 11' and 13, 13', respectively. The secondary windings must be in series opposition for the test but, as will be explained later, no harm will result if the transformers are so connected to the apparatus terminals and to a current source S that the voltage outputs of the secondary windings are in series additive relation. For simplicity and clarity, separate alternating current sources S are indicated as connected to the energizing transformer and to the standard and test transformers but it is to be understood that all current is drawn from the same power distribution system.

Assuming that the circuits of the transformers 31 and 32 are properly connected with the secondary voltages opposed to each other, no potential whatever exists across the terminals 11, 13' when the secondary voltages are equal. If the test transformer 32 differs from the standard transformer 31, a small voltage results across these terminals and is impressed across the modulator bridge 1 through the lead 10 on one side and through lead 24, the resistor-switch network, and lead 14 on the other side. The magnitude and sense of this differential voltage are indicated by the direct current measuring instrument 27 on the voltage range scale that is determined by the particular switch 15—18 that is closed.

It will be apparent that the deflection of the direct current instrument 27 is a function of the phase and magnitude of the alternating current components that are impressed across the respective diagonals of the modulator bridge. The mathematical analysis of this bridge network with three mutually isolated circuits across the rectifier bridge is quite complex and it is not presented here as the general operation of the apparatus can be explained from the known characteristics of the copper-oxide rectifiers a—d of the bridge 1.

It is apparent that the current components entering the bridge 1 are of the same frequency as all transformers are energized from the same source. Referring now to Figure 2, which is a simplified circuit diagram of the phase discriminatory network, the "+" and "−" signs adjacent the ends of the energizing transformer winding 2 and the terminals 11, 13' indicate the polarity of the potentials established at a given instant. The heavy lines and arrows indicate the path and direction of the current flow from the winding 2, and this current will hereafter be referred to as the "switching current." The light lines and arrows indicate the path and direction of the current flow from the terminals 11, 13', i. e. the current established by the differential voltage existing between the secondary windings of the "standard" and "test" transformers 32, 31; and this current will hereafter be referred to as the "actuating current." It is apparent that the two rectifier elements $a$, $b$, are conductive at the indicated polarity of the switching current from winding 2, and that the low resistance conducting path for the flow of the actuating current includes the element $b$. Some part of the actuating current finds a return path through the relatively high resistance rectifier arm $c$, and another part flows through the lower section of the resistor 26 but the major portion of the actuating current takes the path, as indicated by the arrows, through rectifier $b$, the lower half of resistor 25, instrument 27, the upper half of the resistor 26, and the lead 10 to the terminal 11.

The rectifier elements $c$, $d$ are conductive one half cycle later when the polarities of the switching current and of the actuating current are simultaneously reversed. This condition is shown in Figure 3 and inspection of the circuit will show that the current flow through the instrument 27 has not changed direction. Thus, a pulsating, direct current flows through instrument 27 so long as the polarities of the switching and actuating currents change simultaneously. Further, it is to be noted that the instrument circuit is conjugate to the winding 2, hence, the alternating, switching current is excluded from the instrument.

The Figure 4 schematic circuit is similar to that of Figure 3 except that the polarity of the actuating current has been reversed. Inspection of the circuit will show that the current now flows in the reverse direction through the instrument 27. Although the path of high conductivity across the modulator bridge is the same in Figures 3 and 4, the reversed polarity of the actuating current is immediately reflected into the instrument circuit.

Analysis of the measuring circuit discloses that the direct current flow in the measuring circuit of instrument 27 would be proportional to the products of the two alternating current components in the modulator bridge if the rectifier elements operated on a pure square law. However, the rectifier characteristics are such that the response approaches a linear relation and the instrument deflection is, therefore, not strictly proportional to the product but to some smaller value. The exact magnitude of the instrument deflection or the relationship between the instrument and alternating current components is not particularly important as the essential requirement is that the instrument provides substantial deflections to opposite sides of the center zero to indicate the phase relationship between the two potentials impressed across the bridge. Once the constants of the electrical network are determined, the scale of instrument 27 may be calibrated directly in "volts" and suitable markings, such as "in phase" and "out of phase," may be placed on opposite sides of the center zero position. Thus, the instrument will indicate the exact magnitude and the phase relationship of the two bridge potentials.

Copper-oxide rectifiers are asymmetrical conductors and the resistance-current relationship approaches the form of a quadratic curve. A relatively small current flow in the normal or forward direction causes a sharp decrease in the rectifier resistance but further increase of the current flow produces progressively smaller, incremental decreases in the resistance. It may be said, therefore, that the rectifier is subject to current saturation in that a further increase in the current flow produces only a minor change in the resistance. This characteristic is employed to good advantage in the present circuit. By assigning a proper value to the resistor 6, Figure 1, with respect to the potential of the winding 2, the magnitude of the switching current flowing through the modulator bridge is kept somewhat above the saturation point. This current reduces the resistance of the rectifier elements to substantially the lowest value. Hence, voltage fluctuations of the alternating current source do not introduce serious errors in the indications of the instrument. Tests have demonstrated that varying the line voltage between 100–130 volts produces less than 1% error in the instrument reading when the switching current input at this minimum source voltage produces saturation or incipient saturation of the rectifier bridge. This condition is satisfied when the potential across the secondary winding 2 is about 100 volts or greater. Thus it is apparent that the circuit is inherently stable and obviates the need for the adjustable resistors usually employed to compensate for line voltage fluctuations. The apparatus does not require continuous supervision to assure accurate data.

A quick check for ascertaining the condition of the apparatus prior to use is provided by the double throw switch 23. By depressing switch 23 the differential voltage across terminals 11, 13' is removed and the check voltage of winding 28 is applied to the bridge. The value of this check voltage and the resistor 29 are predetermined so that when the switch 23 is depressed, the pointer deflection of the instrument 27 will fall within a predetermined range that may be identified by a suitable reference arc marked upon the scale plate of the instrument. The design is such that the deflection of the instrument pointer, when the switch 23 is depressed, will fall within the reference arc as long as the switching potential of the energizing winding 2 is above 100 volts. Under such check condition, registration of the instrument pointer with the reference arc informs the operator that conditions are proper for proceeding with his tests. A pointer deflection of reduced amount indicates that the line potential is too low.

Transformer defects, which become manifest by a reduction of voltage output, are usually due to a partial short circuiting of the winding. Consequently, such reduction in voltage output is also accompanied by a change in the voltage phase displacement. Inasmuch as wattage is a function of both voltage magnitude and phase, transformers used to actuate watt-hour meters must be tested for both conditions, and the switch 5 and associated elements provide means for measuring the in-phase and quadrature components of the differential voltage existing between the "standard" and "test" transformers. The apparatus is more simple, compact and easy to use than the present devices and methods for accomplishing the same purpose since the source of quadrature exciting voltage is an inherent part of the apparatus, whereas present devices require a polyphase source of supply. Thus, the present apparatus may be employed to check such transformers on location, and without the necessity of changing the primary connections of the exciting transformer from one phase to another.

As explained, the exciting voltage of the winding 2 is normally applied to the bridge 1 through the normally closed contact of switch 5. However, by depressing the switch 5 so that it closes the lower contact, the condenser 7 is inserted into the bridge circuit. Under this condition, the bridge current becomes displaced by approximately 90 degrees. The additional series condenser 8 and shunting resistor 9 supplement the condenser 7 so that the current which flows through the modulator bridge is exactly in quadrature with the line voltage. The manner in which this quadrature current is utilized in the use of the apparatus will be more fully described hereinbelow, in connection with the actual use of the device to test a potential transformer.

To better point out the features of the invention and the manner of its use, the actual procedure for testing a 110 volt potential transformer will now be given. The apparatus may be enclosed in a small case provided with binding posts corresponding to the terminals 11, 11', 13, 13' and pushbuttons for operation of the various switches. The primary of the exciting transformer is connected to the power line or alternating current source S by means of appropriate leads or a plug-in cable connection. The "standard" and "test" transformers are also connected to the same supply line, in any suitable manner, and their secondaries are connected to the terminals 11, 11', 13, 13' of the testing apparatus, as shown. To check the circuit conditions, the operator depresses the circuit check switch 23 and observes the indication of the instrument 27. If the pointer of the instrument registers within the reference arc on the scale plate, he may proceed with his test; if not, he is at once aware that the line potential is too low. He next depresses the 300 volt switch 18 which applies the voltage existing across the terminals 11, 13' upon the modulator bridge. The instrument 27 indicates the magnitude of this voltage on the 300 volt scale. A reading of 220 volts indicates that the "test" and "standard" transformers are connected series aiding instead of series opposition, which condition may be corrected by reversing the leads of either transformer. Proper connection of these transformers results in a very small deflection of the instrument pointer on the 300 volt range, whereupon the operator depresses the switches 18 to 15 in sequence until he obtains a maximum on-scale deflection. The actual reading thus obtained represents that component $e_L$ of the voltage differential between the "standard" and "test" transformers which is either "in phase" or exactly 180 degrees "out of phase" with the exciting potential and, in most cases, is best obtained on the 3 volt scale. However, it occasionally happens that an entire section of a transformer winding becomes short circuited, in which case the voltage output is considerably less than normal and may best be read on the 30 volt range.

Assuming that the pointer of the instrument deflects to that side of the center zero marked "in phase," the voltage component may be represented by $e_L$ on the vector diagram of Figure 5. Next, the quadrature test switch 5 and the 3 volt switch 15 are depressed simultaneously, whereupon the instrument 27 indicates that component $e_Q$ of the actuating voltage which is in quadrature with the line voltage. The resultant $e_x$ represents the true voltage differential between the "standard" and "test" transformers, and this voltage may be added vectorially to the known secondary voltage $E_s$ of the "standard" transformer to obtain the exact voltage $E_T$ of the "test" transformer. It is apparent that the phase angle error of the "test" transformer is represented by the angle $\phi$.

Inasmuch as the final voltage, obtained as described hereinabove, represents the differential voltage between the standard and test transformer, it becomes necessary to know the actual voltage output of the test transformer during the test procedure. For example, if at the time of making the tests, the two transformers are actually delivering 100 volts and the differential voltage is found to be 3 volts, the test transformer has a 3% error. On the other hand, if the same differential exists when the transformers are delivering 130 volts, the error is only 2.3%. The actual voltage output of the test transformer may be obtained by transferring the jumper 12 from terminal 11' to terminal 11 and depressing the 150 volt switch 30.

Having now described my invention, various modifications and variations will be apparent to those skilled in the art. These modifications and variations may be made without departing from the spirit and scope of the invention as defined in the following claims.

I claim:

1. In a portable apparatus for measuring the in-phase and quadrature voltage components of a test source of alternating current with respect to a reference voltage, a modulator bridge having rectifier elements arranged in the same sense in the respective side arms thereof, a transformer having a primary winding for connection to the source of reference voltage and a secondary winding for developing a voltage sufficient to saturate the modulator bridge, an energizing circuit connected across one set of opposed junctions of said bridge and comprising said secondary winding in series with a phase-shifting network, said phase-shifting network including a resistive and a capacitive impedance with a switch for completing said energizing circuit through the resistive or alternatively the capacitive impedance, an actuating circuit connected to the other set of opposed junctions of said bridge and including terminals for receiving connections from the test source of alternating current, a center-tapped resistor connected across each set of opposed bridge junctions, and a direct current measuring instrument connected between the center taps of said resistors.

2. In a portable apparatus, the invention as recited in claim 1, in combination with an additional winding on said transformer for developing a checking voltage, and a switch for opening said actuating circuit and for connecting said additional winding across said bridge in place of said actuating circuit.

3. In a portable apparatus, the invention as recited in claim 1, wherein said terminals of the actuating circuit comprise, in series, two pairs of terminals across which the secondary windings of a standard transformer and of a test transformer may be connected.

4. In apparatus for determining the operating characteristics of a test transformer, a modulator bridge having rectifier elements in the respective side arms thereof and all arranged in the same sense, an actuating circuit connected across one set of opposed junctions of said bridge and including sets of terminals to which the secondary windings of said test transformer and of a standard transformer may be connected in series opposition, an energizing circuit connected across the other set of opposed junctions of said bridge to establish a substantially saturating current through said modulator bridge, said energizing circuit including the secondary winding of an energizing transformer and means adjustable to shift the phase of the voltage input to the bridge by 90°, a center-tapped resistor connected across each set of opposed bridge junctions, and a direct current measuring instrument, and circuit elements connecting said instrument between the center taps of said resistors.

5. In apparatus for determining the operating characteristics of a test transformer, the invention as recited in claim 4, in combination with an additional winding on said energizing transformer for developing a checking voltage, and switch means for connecting said additional winding across said bridge in place of said actuating circuit.

JOHN H. MILLER.